United States Patent [19]

Cassens, Jr.

[11] Patent Number: 5,002,908

[45] Date of Patent: Mar. 26, 1991

[54] RESIN BONDED REFRACTORY SHAPE AND METHOD OF MAKING

[75] Inventor: Nicholas Cassens, Jr., Pleasanton, Calif.

[73] Assignee: National Refractories & Minerals Corporation, Oakland, Calif.

[21] Appl. No.: 428,965

[22] Filed: Oct. 30, 1989

[51] Int. Cl.$^5$ .............................................. C04B 35/54
[52] U.S. Cl. ........................................ 501/99; 501/94; 501/100
[58] Field of Search ........................... 501/99, 100, 94

[56] References Cited

U.S. PATENT DOCUMENTS

| | | | |
|---|---|---|---|
| 3,280,231 | 10/1966 | Bentolila et al. | 501/99 |
| 3,370,968 | 2/1968 | Weaver | 501/99 |
| 4,072,531 | 2/1978 | Funabiki et al. | 501/99 |
| 4,130,438 | 12/1978 | Watanabe et al. | 501/101 |
| 4,334,029 | 6/1982 | Naito et al. | 501/109 |
| 4,375,518 | 3/1983 | Henry, Jr. et al. | 501/99 |
| 4,431,744 | 2/1984 | Kernion et al. | 501/99 |
| 4,471,059 | 9/1984 | Yoshino et al. | 501/99 |
| 4,550,015 | 10/1985 | Korb et al. | 501/99 |
| 4,605,635 | 8/1986 | Zenbutsu et al. | 501/99 |

FOREIGN PATENT DOCUMENTS

| | | | |
|---|---|---|---|
| 0012211 | 1/1977 | Japan | 501/99 |
| 0007871 | 1/1982 | Japan | 501/99 |
| 0042212 | 3/1985 | Japan | 501/99 |
| 1063566 | 4/1986 | Japan | 501/99 |

*Primary Examiner*—William R. Dixon, Jr.
*Assistant Examiner*—Sue Hollenbeck
*Attorney, Agent, or Firm*—Andrew E. Barlay

[57] ABSTRACT

A resin bonded refractory composition of increased pressability and consequently increased density and strength is made by adding potassium borate to prior art refractory compositions.

26 Claims, No Drawings

RESIN BONDED REFRACTORY SHAPE AND METHOD OF MAKING

BACKGROUND OF THE INVENTION

This invention pertains to refractory shapes such as brick and particularly to such shapes having a resin bond.

Carbon bonded refractories, particularly those containing basic aggregate such as periclase, have come into widespread use in recent years.

It has been discovered that refractories containing carbon are protected by their carbon content so that they do not wear as rapidly in a steelmaking environment as similar refractories not containing carbon.

Formerly, such carbon containing refractories were made with tar or pitch as a binder, but there were problems because tar bonded brick had to be made at elevated temperatures (where the tar or pitch was liquid) and subsequently heated to even higher temperatures to "cure" or harden the bond so the brick could be handled, as for shipping or installing. See, for example, U.S. Pat. Nos. 4,184,883 and 4,558,019.

Resin bonds obviate some of these problems. For example, resin bonds can be liquid at room temperature and therefore a refractory mix with a resin bond does not need to be heated in order to form brick. See, for example, U.S. Pat. Nos. 4,216,020 and 4,306,030.

However, the use of resin bonds introduced other problems. One big problem is that it is hard to achieve the desired density, and consequent strength and other properties, with a resin bond. This is apparently because it is very difficult to remove the air through the viscous resin when the refractory mix is pressed.

It has been found that adequate density (and strength) can be obtained in such brick if, in pressing the brick, the refractory material in the die box of the press is subjected to a series of maximum or elevated pressures alternated with lowered pressure on the press. The maxima in this pressure cycle are often referred to as "impacts", the number of impacts being the number of applications of maximum or elevated pressure separated by lowered pressure.

In the past it has been necessary to apply up to 15 or more impacts to a resin bonded brick to achieve the desired density. Furthermore, it has been found that the increase in density with number of impacts is not linear, but that there is a levelling off of density with increased number of impacts. In other words, no matter how many impacts are applied to the brick, it never reaches more than an asymptotically approached maximum density.

It will be evident to those skilled in the art that the necessity for applying multiple impacts to resin bonded brick to achieve the required density makes for a relatively slow and therefore expensive pressing operation.

The present invention overcomes or at least greatly reduces this problem and enables more rapid production of resin bonded brick. Briefly, with the use of the present invention, not only can a given, desired density (and consequent strength) be obtained in a brick with fewer impacts during pressing, but in addition it is possible, if desired, to reach a higher ultimate density (and strength). In other words, when the present invention is used, the curve of density vs. the number of impacts rises faster and reaches a higher ultimate density than with prior art methods and compositions. This ability to achieve a desired density is referred to herein as "pressability".

BRIEF DESCRIPTION OF THE INVENTION

It has now been found, according to this invention, that the advantages described above can be obtained with a refractory composition consisting essentially of (a) from 1% to 5% of a liquid resin, (b) from 0% to 3% of a powdered resin, (c) from 0.1% to 1.5% of potassium borate, (d) from 0% to 40% of graphite, (e) from 0% to 5% of carbon black, and (f) from 0% to 8% of an antioxidant, the balance being sized refractory aggregate, all percentages being by weight and based on the total weight of the composition.

DETAILED DESCRIPTION OF THE INVENTION

The resins used to bond refractories according to this invention are well known in the art and need not be described in great detail. Preferably, the liquid resin will be a phenolic resin (a term well recognized in the art), most commonly a resol resin. At least a portion of the resin will be in liquid form since such a resin supplies the liquid which lubricates the refractory aggregate during pressing and permits the refractory particles to move past one another to achieve best packing of the particles and therefore the maximum density.

In a preferred embodiment of the invention, the composition contains, in addition to the liquid resin, a dry, finely divided powdered resin, for example a novolak phenolic resin, all these different types of resins being well known in this art. When the dry resin is used, it will be in an amount up to 3% by weight of the total composition. As indicated, the total amount of resin will be from 1% to 8%. If a dry resin is used, the amount of liquid resin may be reduced, but in any case the amount of each resin will be within the limits given.

The aggregate used can be any of many known in this field, for example clay-alumina aggregates such as fireclay, bauxite, or aluminum oxide or basic aggregates such as dolomite or olivine. A preferred aggregate is a magnesia-containing aggregate, and a particularly preferred aggregate is periclase containing 90% or more MgO. The aggregate will be sized for best packing, as is known in this art, and can range in size from a centimeter or so in diameter down to particles a few microns in diameter.

The potassium borate used in this invention is conveniently a hydrated form of the material, $K_2B_{10}O_{16} \cdot 8H_2O$, and numerical references to amounts of the potassium borate are to the hydrated form of the material designated above. It is a standard article of commerce widely available. It is used in the form of a solid powder, generally of a size such that all particles have a diameter of 1 mm or less. It need not be of CP ("chemical purity") grade, but should contain not over 5% impurities. Fluorine is to be particularly avoided; it should be less than 1%. If other forms of potassium borate, for example an anhydrous potassium borate or one with other amounts of water of hydration, is used, appropriate adjustments will be made in the amount used.

In addition, the composition may contain, as is common in resin bonded brick, graphite, preferably flake graphite, in an amount up to 40% by weight of the composition. The graphite will be of a size such that all is less than 2 mm in diameter and will contain at least 80% carbon.

Another optional ingredient, one which further enhances the benefits of the invention, is carbon black (again, a well known ingredient in this field), used in an amount from 0.1% to 1.5% of the total weight of the composition. The carbon black also will be a fine powder substantially all smaller than 0.05 mm in diameter and will contain at least 95 % carbon. Preferably, the carbon black will be a thermal black. Carbon black, being very fine, fills small gaps in the granular mixture, thus reducing porosity. It also serves as an oxygen getter.

Still another optional ingredient, a well known addition to this type of brick, is an antioxidant such as powdered aluminum or an alloy of aluminum, for example an aluminum-silicon or aluminum-magnesium alloy, or silicon, or boron carbide ($B_4C$). The antioxidant will be finely divided, for example substantially all finer than 300 microns (all passing a 48 mesh screen).

In making brick according to this invention, all the dry ingredients are added together in a mixer, for example an Eirich or Muller mixer, and blended. Then, the liquid resin is added, with further mixing to disperse the liquid.

After all the ingredients have been added and mixed, the batch is taken to a press where a measured amount is placed in the press die and compacted. Densities obtainable with prior art mixes by up to 15 impacts can be obtained with compositions according to this invention with as few as 5 impacts. Or, if desired, even higher densities than heretofore obtainable can be obtained by using 10 or 12 impacts.

Before shipping to the customer for installation, for example in a steelmaking or steel alloying furnace, the brick are cured, for example at a temperature of 180° C. for 5 hours.

EXAMPLES

Three compositions were made all based on the same basic formulation: 75.7 parts of a high purity periclase having the following typical chemical analysis: 0.5% CaO, 0.2% $SiO_2$, 0.3% $Fe_2O_3$, 0.1% $Al_2O_3$, 0.1% $MnO_2$, 0.01% $B_2O_3$, and (by difference) 98.8% MgO, and sized so that substantially all was less than 4.7 mm in size (passed a 4 mesh screen) and substantially all was larger than 0.15 mm (retained on a 100 mesh screen); 18.5 parts flake graphite (containing at least 90% carbon, and all being finer than 0.83 mm); 3 parts carbon black (containing 99% carbon, and all being finer than 44 microns); and 2.8 parts liquid resin.

Composition A was the base composition just described without any further addition, Composition B was the base composition with 0.5 part potassium borate added, and Composition C was the base composition with 1 part potassium borate added.

The three batches were mixed in an Eirich mixer for 10 minutes, and brick were pressed from each composition using 15 impacts on the press and then cured at 180° C. for 5 hours.

The cold (room temperature) modulus of rupture (CMOR) was measured for each composition. A had 1475 psi, B had 1805 psi, and C had 1850 psi. This clearly shows the advantage of adding potassium borate to achieve higher strength at a constant number of pressing impacts.

A second series of brick were made using the following base composition: 73.5 parts periclase having a typical chemical composition of 2.1% $SiO_2$, 1.1% CaO, 0.3% $Fe_2O_3$, 0.2% $Al_2O_3$, 0.2% $B_2O_3$, and (by difference) 96.1% MgO, and sized so that substantially all was smaller than 4.7 mm (passed a 4 mesh screen) and substantially all was larger than 0.2 mm (retained on a 65 mesh screen; 20.5 parts of the same flake graphite used in the first series; 2.5 parts aluminum metal powder; 2.3 parts of the same liquid phenolic resin used in the first series; and 1 part dry powdered novolak phenolic resin.

Composition D was the base composition without further addition and Composition E was the base composition with the further addition of 0.4 part potassium borate. Brick were pressed from each composition using different numbers of pressure cycles or impacts on the press as indicated in Table I. The brick were cured as with the first series, coked by heating to 982° C. for 180 minutes, and then ignited by heating to 1093° C. for 48 hours. The bulk density (in pounds per cubic foot, pcf) was measured after coking and again after igniting; the carbon yield was also measured after igniting. These results are also presented in Table I.

TABLE I

|  | Composition D | Composition E |
|---|---|---|
| Bulk Density, Coked (pcf) | | |
| 3 impacts | — | 172 |
| 4 impacts | — | 173 |
| 5 impacts | — | 173 |
| 6 impacts | 169 | 172 |
| 8 impacts | 171 | 172 |
| Bulk Density, Ignited (pcf) | | |
| 3 impacts | — | 141 |
| 4 impacts | — | 141 |
| 5 impacts | — | 142 |
| 6 impacts | 139 | 142 |
| 8 impacts | 140 | 142 |
| Carbon Yield (%) | | |
| 3 impacts | — | 95.5 |
| 4 impacts | — | 95.2 |
| 5 impacts | — | 95.5 |
| 6 impacts | 93.2 | 94.2 |
| 8 impacts | 92.9 | 95.0 |

This series clearly shows the benefit of the potassium borate addition in achieving better density. Composition E attained, with as few as 3 impacts, densities greater than those obtained for Composition D with as many as 8 impacts. Also, the carbon yield was higher with Composition E.

A third series was made with 98.6 parts periclase (77.9 parts of which were substantially all smaller than 4.7 mm (passing a 4 mesh screen) and substantially all larger than 0.15 mm (retained on a 100 mesh screen), and 20.7 parts of which were substantially all smaller than 0.15 mm (passing a 100 mesh screen), 2 parts of the liquid resin previously used, and 1 part of the dry resin used in the second series.

Composition F was a base composition using the periclase used in the first series and Composition H was a base composition using the periclase used in the second series. Composition G was the same as F but with the addition of 0.4 part potassium borate. Composition J was the same as H but with the same 0.4 part potassium borate addition.

Brick were pressed from all four of these compositions using 8 impacts. After the brick were cured as described above, the CMOR and apparent porosity were measured, and after coking as described above, the CMOR was measured. The results are presented in Table II.

TABLE II

| Composition | F | G | H | J |
|---|---|---|---|---|
| App. Porosity, Cured (%) | 7.1 | 6.9 | 6.8 | 7.0 |
| CMOR, Cured (pcf) | 3400 | 4710 | 3780 | 4050 |
| CMOR, Coked (pcf) | 1065 | 1550 | 950 | 1385 |

The benefits of the potassium borate addition are thus shown for compositions containing no graphite or carbon black.

As a final example of the practice of this invention, a composition of 71.3 parts of the periclase used in the first series, 20 parts of the flake graphite used in the first series, 4 parts of the aluminum metal used in the second series, 2.8 parts of the liquid phenolic resin used in the first series, 1 part of the dry powdered resin used in the second series, 0.5 part of the carbon black used in the first series, and 0.4 parts of potassium borate was made and pressed into brick which were subsequently cured as described above.

In the specification and claims, percentages and parts are by weight unless otherwise indicated, except that porosities are in volume percent.

What is claimed is:

1. A resin bonded refractory composition suitable for pressing shapes and having improved pressability prior to curing, said composition consisting essentially of (a) from 1% to 5% of a liquid resin, (b) from 0% to 3% of a powdered resin, (c) from 0.1% to 1.5% of potassium borate, (d) from 0% to 40% of graphite, (e) from 0% to 5% of carbon black, and (f) from 0% to 8% of an antioxidant, the balance being sized refractory aggregate, all percentages being by weight and based on the total weight of the composition.

2. Composition according to claim 1 wherein the liquid resin is a phenolic resin.

3. Composition according to claim 2 wherein the phenolic resin is a resol resin.

4. Composition according to claim 1 containing from 1% to 3% of a powdered resin.

5. Composition according to claim 4 wherein the powdered resin is a phenolic resin.

6. Composition according to claim 5 wherein the powdered phenolic resin is a novolak resin.

7. Composition according to claim 1 containing from 0.5% to 5% carbon black.

8. Composition according to claim 7 wherein the liquid resin is a phenolic resin.

9. Composition according to claim 8 wherein the liquid phenolic resin is a resol resin.

10. Composition according to claim 9 containing from 1% to 3% of a powdered resin.

11. Composition according to claim 10 wherein the powdered resin is a phenolic resin.

12. Composition according to claim 11 wherein the powdered phenolic resin is a novolak resin.

13. Method of improving the pressability prior to curing of resin-bonded refractory shapes comprising adding to the refractory mix from which the shapes are to be formed, prior to final mixing and pressing, from 0.1% to 1.5% by weight, based on the total weight of the refractory mix, potassium borate.

14. Method according to claim 13 wherein the refractory is bonded with a liquid resin.

15. Method according to claim 14 wherein the liquid resin is a phenolic resin.

16. Method according to claim 15 wherein the liquid phenolic resin is a resol resin.

17. Method according to claim 14 wherein the refractory mix contains a powdered resin in addition to the liquid resin.

18. Method according to claim 17 wherein the powdered resin is a phenolic resin.

19. Method according to claim 18 wherein the powdered phenolic resin is a novolak resin.

20. Method according to claim 13 wherein the refractory mix contains from 0.5% to 5% carbon black.

21. Method according to claim 20 wherein the refractory is bonded with a liquid resin.

22. Method according to claim 21 wherein the liquid resin is a phenolic resin.

23. Method according to claim 22 wherein the liquid phenolic resin is a resol resin.

24. Method according to claim 21 wherein the refractory mix contains a powdered resin in addition to the liquid resin.

25. Method according to claim 24 wherein the powdered resin is a phenolic resin.

26. Method according to claim 25 wherein the powdered phenolic resin is a novolak resin.

* * * * *